(12) United States Patent
Buchko et al.

(10) Patent No.: US 8,467,389 B2
(45) Date of Patent: Jun. 18, 2013

(54) SUBSCRIPTION MANAGEMENT AND ROUTING PROTOCOL (SMRP) AND METHOD

(75) Inventors: Steve W. Buchko, Dunrobin (CA); Shawn McAllister, Manotick (CA); David W. Horton, Ottawa (CA); Duane Pauls, Stittsville (CA); David Pochopsky, Kanata (CA)

(73) Assignee: Solace Systems, Inc., Ottawa, Ontario (CA)

( * ) Notice: Subject to any disclaimer, the term of this patent is extended or adjusted under 35 U.S.C. 154(b) by 345 days.

(21) Appl. No.: 13/028,666

(22) Filed: Feb. 16, 2011

(65) Prior Publication Data

US 2012/0207159 A1 Aug. 16, 2012

(51) Int. Cl.
*H04L 12/56* (2006.01)
(52) U.S. Cl.
USPC ......................................... 370/390

(58) Field of Classification Search
USPC .................. 370/390, 220, 235, 400, 402, 408
See application file for complete search history.

(56) References Cited

U.S. PATENT DOCUMENTS 7,801,857 B2    9/2010 Betts et al.

*Primary Examiner* — Dang Ton
*Assistant Examiner* — Nourali Mansoury
(74) *Attorney, Agent, or Firm* — Marks & Clerk; Richard J. Mitchell

(57) ABSTRACT

A method of propagating multicast subscription and routing information between routers in a network, and constructing forwarding tables in the routers, allowing providers of the data (the publishers), and the multicast recipients of the data (the subscribers) to be decoupled from and have no knowledge of one another. This is done without the need to maintain (Source Network, Published-Multicast-Group) State in the routers, for a highly scalable solution in those applications where there is a possibility for a large, or infinite number of Published-Multicast-Groups, and in those applications where messages are being routed by content, so it is impossible to identify published-multicast-groups.

27 Claims, 14 Drawing Sheets

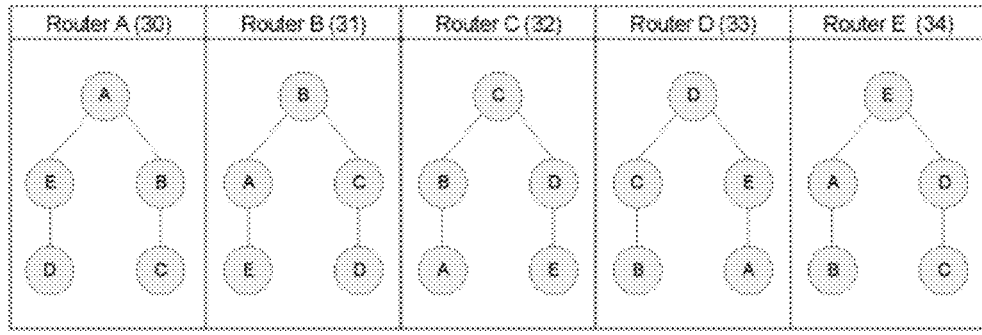
Fig. 5
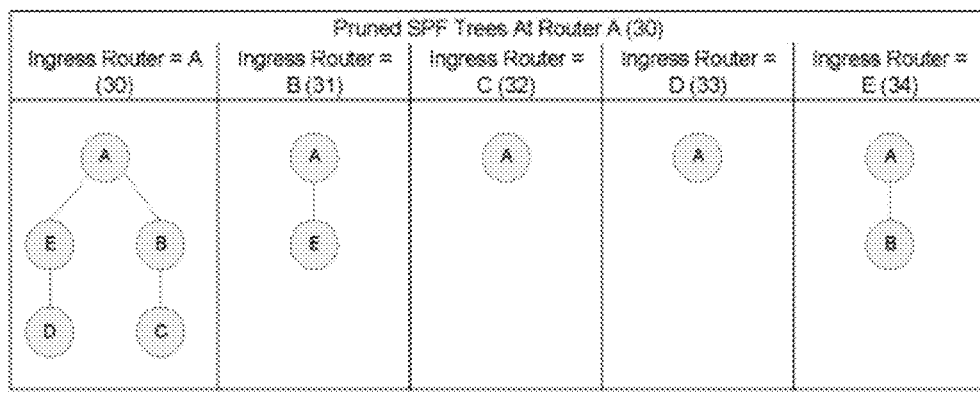
Fig. 6
Fig. 7

| Message Type | Message Fields | Description |
| --- | --- | --- |
| Common Header | SMRP Version – UINT16<br>Minimum Compatible Version – UINT16<br>Message Length – UINT32<br>MessageType – UINT4<br>xmitTask – UINT64 | This common header is present for all SMRP messages |

Fig. 16

| Message Type | Message Fields | Description |
| --- | --- | --- |
| DbSummaryMsg | checksumUsedInBlocks – boolean<br>numBlocksInDb – UINT32<br>blockSummaryChecksum – UINT32<br>numSubscriptionsInDb – UINT32<br>VRN – String | This message is only initiated by the active router for a given VRN, and is flooded down the SPF tree rooted at the active router. The message is used to ensure that old database contents for a VRN are removed from the network when a router restarts and comes back online. Also, by including the blockSummaryChecksum, (which is the checksum computed across the BlockSummaryMsg for the VRN), it allows routers to detect inconsistencies in their local copies of the VRN's SMRP database. Including the blockSummaryChecksum in this message means that we don't have to periodically flood the BlockSummaryMsg, which is too large a message to be flooding at regular intervals.<br><br>The active router for the VRN will generate this message at one minute intervals. |

Fig. 17

| Message Type | Message Fields | Description |
| --- | --- | --- |
| SubscriptionBlockSummary Msg | checksumUsedInBlocks – boolean<br>requestFlag – boolean<br>numBlocksInDb – UINT32<br>blockSummaryChecksum – UINT32<br>numSubscriptionsInDb – UINT32<br>VRN – String<br>BlockSummaryArray[] – BlockInfo<br><br>BlockInfo {<br>  blockID – UINT32<br>  seqNum – UINT32<br>  blockKey – UINT64<br>  blockChecksum – UINT32<br>  checksumInUse – boolean<br>  persistence – Persistent \| NonPersistent<br>  blockUpdatedBy – Primary \| Backup<br>  numSubscriptionsInBlock – UINT16<br>} | Contains an array of version numbers for all non-empty subscription blocks for the VRN.<br><br>Each BlockInfo record in the blockSummaryArray optionally includes a blockChecksum. That checksum is the checksum that the block's corresponding BlockContentsMsg is expected to have.<br><br>The requestFlag is used to request that the receiving router send back a Block Summary Message. |

Fig. 18

| Message Type | Message Fields | Description |
|---|---|---|
| SubscriptionBlockContentsMsg | blockID - UINT32<br>seqNum - UINT32<br>blockKey - UINT64<br>blockChecksum - UINT32<br>checksumInUse - boolean<br>persistence - Persistent \| NonPersistent<br>blockUpdatedBy - Primary \| Backup<br>numSubscriptionsInBlock - UINT16<br>MsgVpnHash - UINT64<br>MsgVpnName - String<br>subscriptionArray[] - Subscription<br><br>Subscription {<br>  operation - Add \| Remove<br>  deliverAlways - boolean<br>  subscriptionIndex - UINT16<br>  subscriptionLength - UINT8<br>  subscriptionString - String<br>} | Contains the complete set of subscriptions for the subscription block.<br><br>The receiver of the message should verify that the checksum is valid for the message before placing the block in the local SMRP database. If the checksum is not valid, the receiver should discard the message, and send a request for the block. |

Fig. 19

| Message Type | Message Fields | Description |
|---|---|---|
| SubscriptionBlockDeltaUpdateMsg | blockID - UINT32<br>seqNum - UINT32<br>blockKey - UINT64<br>blockChecksum - UINT32<br>checksumInUse - boolean<br>persistence - Persistent \| NonPersistent<br>blockUpdatedBy - Primary \| Backup<br>numSubscriptionsInBlock - UINT16<br>MsgVpnHash - UINT64<br>NumAddsInUpdate - UINT16<br>NumRemovesInUpdate - UINT16<br>subscriptionArray[] - Subscription<br><br>Subscription {<br>  operation - Add \| Remove<br>  deliverAlways - boolean<br>  subscriptionIndex - UINT16<br>  subscriptionType - topic \| xpe<br>  subscriptionLength - UINT8<br>  subscriptionString - String<br>} | Contains a list of delta's from the previously advertised version of the block.<br><br>The receiver of the message should verify that the msgChecksum is valid for the message before updating the block in the local SMRP database. If the checksum is not valid, the receiver should discard the update, and send a request for the block.<br><br>The blockChecksum in this message is the checksum that a BlockContentsMsg is expected to have once the update is applied to the block. If the blockChecksum does not match after applying the update, the receiving router should back out the update, and request a BlockContentsMessage |

Fig. 20

| Message Type | Message Fields | Description |
|---|---|---|
| BlockContentsRequestMsg | blockId - UINT32 | Used to request a "blockContents" message from a peer router. |

SUBSCRIPTION MANAGEMENT AND ROUTING PROTOCOL (SMRP) AND METHOD

FIELD OF THE INVENTION

This invention relates to data communication networks, and in particular to a specific method of propagating multicast subscription and routing information between routers in a network.

BACKGROUND OF THE INVENTION

In the prior art, different multicast routing protocols have been defined to distribute subscription interest in a communications network. Some examples include the IP multicast routing protocols such as DVMRP (IETF rfc1075), PIM (IETF rfc4601), MOSPF (IETF rfc1584), and Solace's content-routing protocol XSMP (U.S. Pat. No. 7,801,857).

Existing IP multicast routing protocols require dynamic creation and management of (Source-Network, Published-Multicast-Group) state (i.e. (S,G) state) in each router, on a per-published-mcast-group basis. This results in scaling issues when there are a large numbers of potential groups that a publisher can send on, especially if the multicast groups are not IP addresses, but are a hierarchical topics, since the topic subscriptions may be wild-carded, and could match an infinite number of published topics. Furthermore, if messages are being routed based on message content, as discussed in U.S. Pat. No. 7,801,857, then it is impossible to maintain (S,G) state in the router, as there are no explicit published-multicast-groups to maintain state on.

SMRP does not maintain (S,G) state in the router, and thus is highly scalable in applications where the number of routers in the network is small compared to the number of potential published multicast groups, which can be very large or infinite.

In content routing networks, SMRP is an alternative routing protocol to the XSMP protocol described in U.S. Pat. No. 7,801,857. SMRP scales to a much higher number of subscriptions in the network, and solves a fundamental scaling issue with XSMP that resulted in the protocol overhead for a published message consuming more network bandwidth than the message itself when the message was being delivered to a large number of routers. Unlike XSMP, SMRP does not require the insertion of a "destination list" into each message, or the modification of that "destination list" in each router. The "destination list" was fundamental to XSMP, and was very costly in terms of end-to-end latency, per-router processing overhead per message, and network bandwidth consumption when the message needed to be delivered to a large number of routers in the network.

Of the existing prior art, the Subscription Management and Routing Protocol (SMRP) described in this invention has the strongest similarities with MOSPF, but differs significantly from MOSPF in the following areas:

MOSPF combines physical topology and mcast subscription propagation in a single routing protocol. SMRP is only responsible for subscription propagation, and the invention incorporates modifications to an existing underlying link-state protocol (such as Solace's XLSP Protocol (U.S. Pat. No. 7,801,857), or OSPF (IETF rfc2328), or IS-IS (ISO/IEC 10589:2002)), to construct a per-source-router Pruned SPF Tree and Pruned FIB which contains the reachability information for each router in the network. The Pruned FIB is used in conjunction with the subscription information provided by SMRP to provide loop-free forwarding of the multicast data messages.

MOSPF builds, in each router, a forwarding tree per (source network, mcast destination). This results in the construction and maintenance of a large number of forwarding trees. SMRP builds, in each router, a SMRP routing table, which contains a lookup tree of (mcast-subscription→{subscribing router list}), where a given mcast-subscription in the tree can be either a fully-qualified subscription or a wildcarded subscription. When a data message arrives, the message's mcast destination is looked up in the SMRP routing table, and the list of all matching {subscribing routers} is retrieved from the routing table. That {subscribing router list} is then passed through an underlying Pruned FIB to determine which next-hop(s) the message must be delivered to. This two-stage lookup can easily be implemented in hardware for very high performance, eliminates the need to maintain (S,G) state, and results in a much smaller number of forwarding trees that need to be maintained per router compared to MOSPF, or other IP multicast routing protocols MOSPF must dynamically build a new forwarding tree whenever it encounters a data message published to an (S,G) pair that it has not seen before. SMRP does not ever need to build new forwarding tables based on the contents of a data message, and the underlying SPF routing mechanism only needs to recompute the Pruned SPF trees and Pruned FIBs when a new router is discovered in the network, or the physical topology of the network changes.

MOSPF must flush all the forwarding trees for all (S,G) pairs if the physical topology of the network changes. SMRP is not impacted by topology changes, the underlying SPF routing mechanism simply recomputes the Pruned SPF trees and Pruned FIBs when the physical topology of the network changes.

MOSPF sends a separate Link-State-Advertisement (LSA) message per multicast subscription. This can result in large numbers of LSAs needing to be advertised when connectivity to a router is lost and then restored. SMRP groups subscription information into subscription blocks which can be summarized and compared following a connectivity failure, so that only the changed blocks need to be readvertised when connectivity is restored. SMRP also provides the ability to advertise delta updates to the subscription blocks, to minimize the network overhead of advertising individual subscription updates.

SMRP uses the periodic flooding of DbSummary messages to refresh routing state in the network, thus avoiding the need to periodically flood/refresh the full multicast subscriptions as is common in the art today.

SUMMARY OF THE INVENTION

Embodiments of the present invention provide a method of propagating multicast subscriptions throughout a network, for constructing a multicast routing table, and for constructing Pruned Shortest Path First (SPF) Trees and Pruned FIBs, which are used to forward multicast data messages between routers in the network in a loop-free fashion.

Thus according one aspect of the present invention there is provided a method of routing multicast messages in a network wherein subscribers receive messages from publishers based on subscriptions, the network comprising a plurality of n interconnected routers, the method comprising propagating the physical topology of the network using a link state routing protocol; propagating subscription interests of subscribers throughout the network using a subscription management protocol decoupled from the link state routing protocol; maintaining a subscription database at each router; at each router in the network computing n shortest-path first trees from a root router to every other router in the network, wherein one shortest-path first tree computed at each router is rooted at each router in the network; pruning said n shortest-path first trees at each router to remove any routers upstream of that router to create n pruned shortest-path first trees wherein each pruned shortest-path first tree at that router contains only that router and any routers downstream thereof; constructing a pruned forwarding information base (FIB) at each router containing said n pruned shortest-path first trees; and at a particular receiving router forwarding multicast messages received from an originating router using the pruned shortest-path first tree in the pruned FIB at the receiving router associated with the originating router.

Subscription interest and network topology are communicated using separate routing protocols. The Subscription Management and Routing Protocol (SMRP) is used to advertise multicast subscription interest. A modified version of an existing link state protocol (such as Solace's XLSP protocol, or OSPF, or IS-IS) may be used to advertise network topology, and the bindings of virtual routers to physical routers for the purposes of router fault tolerance and redundancy. By decoupling subscriptions from topology, rapid re-routes around failed links or routers can be achieved, without needing to readvertise large numbers of subscriptions, or recompute large numbers of forwarding tables.

The providers of the data (the publishers), and the multicast recipients of the data (the subscribers) are decoupled from and have no knowledge of one another, and to forward the multicast data through the network in a loop-free manner Embodiments of the invention group the subscription information into subscription blocks which can be summarized and compared following a connectivity failure, so that only the changed blocks need to be readvertised when connectivity is restored. The invention may also provide the ability to advertise delta updates to the subscription blocks, to minimize the network overhead of advertising individual subscription updates.

Hold-down timers may be used to optimize network bandwidth utilization while advertising subscription updates into the network.

An updatedBy field is included in the routing messages to specify which physical router originated the routing update on behalf of a virtual router, so that the system can detect and recover from "split brain" scenarios wherein more than one router may have been active on behalf of a virtual router, and generating routing updates for that virtual router Embodiments of the invention thus provide a modification of the SPF routing protocol to create source-router based, Pruned Shortest-Path-First Trees and Pruned FIBs to model the network connectivity between the routers, to decouple the network topology of the routers from the specific multicast subscriptions, and to eliminate the need to create, maintain, and/or dynamically modify a unique forwarding trees per destination-multicast-group or topic. The Pruned Shortest-Past-First Tree may contain an SPF graph of all routers, which are downstream of the router where the SPF computation was made. The Pruned FIBs contain the next-hop information for all routers, which are downstream of the router where the SPF computation was made.

Embodiments of the invention may provide a multicast subscription management protocol which uses a flooding mechanism to propagate the subscription interests of each router, and which is decoupled from the physical link topology of the network. A multicast forwarding table, which is constructed in each router, lists all network routers that have subscribed to a particular multicast group, topic, or content.

The multicast routing and forwarding may be performed without the need to maintain (S,G) state in each router.

The multicast subscriptions advertised may be hierarchical topics with or without wildcards, content subscriptions, IP multicast addresses, or any other form of subscription wherein the publishers and subscribers are completely decoupled.

In one embodiment, the subscription database is divided up into blocks to avoid having to flood the entire subscription database for a router, when subscription interests change. Delta updates to subscription blocks are flooded to all routers in the network whenever possible, to avoid having to flood an entire block when some subscriptions change within a block. A router requests the full block contents upon receiving a delta update, and through examination of the sequence number in the delta update, detects that one or more previous delta update were missed for any reason.

BRIEF DESCRIPTION OF THE DRAWINGS

The invention will now be described in more detail, by way of example only, with reference to the accompanying drawings, in which:—

FIG. 5 illustrates the SPF trees calculated for each router;

FIG. 6 illustrates the pruned SPF trees generated by Router 30;

FIG. 7 illustrates the pruned FIBs created in Router 30;

FIG. 16 shows an example of the contents of a common message header that can be used by SMRP;

FIG. 17 shows an example of the contents of a DbSummary message that can be used by SMRP;

FIG. 18 shows an example of the contents of a SubscriptionBlockSummary message that can be used by SMRP;

FIG. 19 shows an example of the contents of a SubscriptionBlockContents message that can be used by SMRP;

FIG. 20 shows an example of the contents of a SubscriptionBlockDeltaUpdate message that can be used by SMRP;

FIG. 21 shows an example of the contents of a BlockContentsRequest message that can be used by SMRP.

DETAILED DESCRIPTION OF THE PREFERRED EMBODIMENTS

Figure 1:
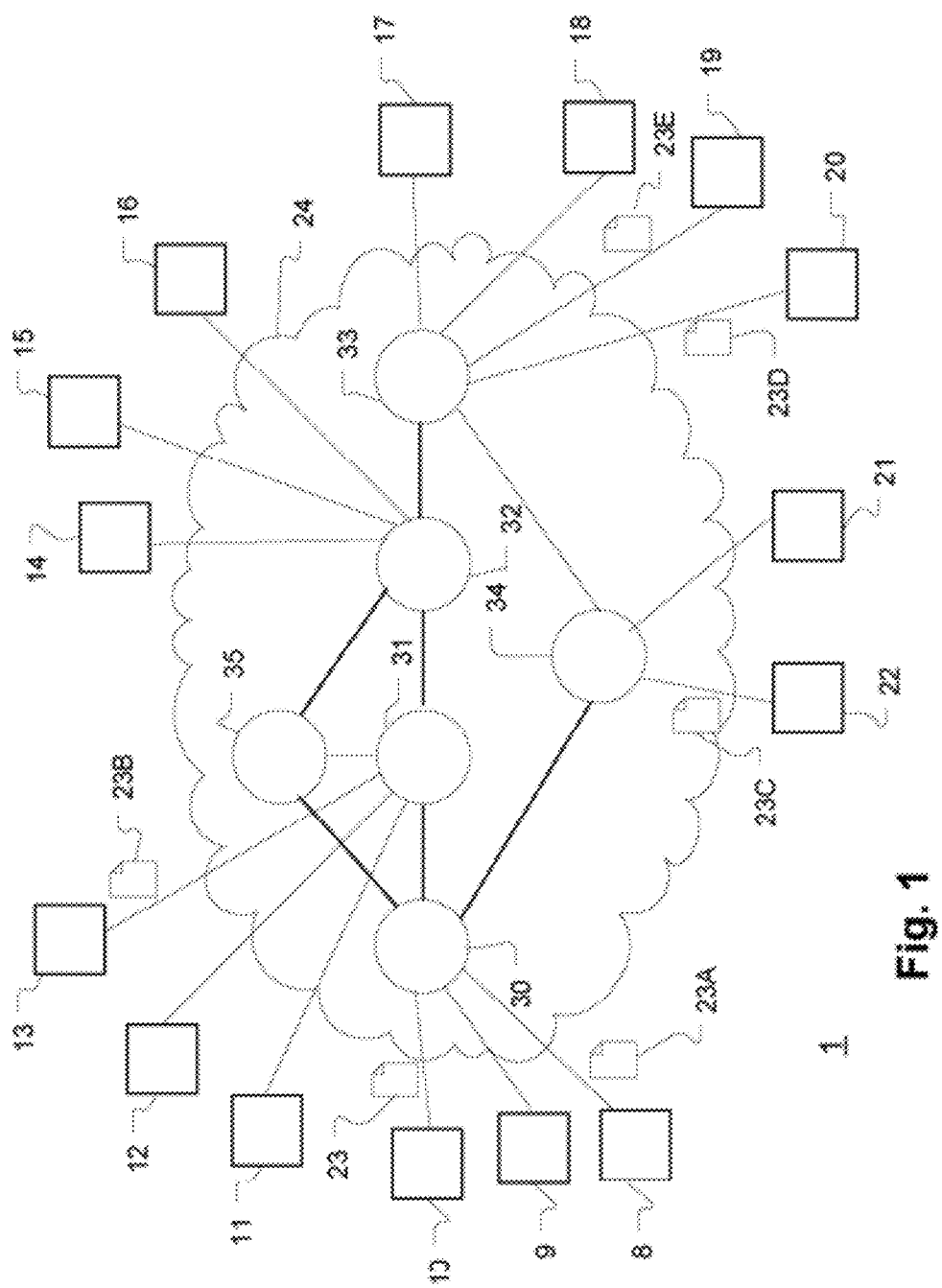
FIG. 1 shows an example message network that uses SMRP to propagate subscription information between routers.

FIG. 1 shows an example system 1 which consists of a message delivery network 24 which is providing a scalable, distributed multicast message delivery service, as well as clients for the service. Network 24 consists of message delivery routers 30 through 35, which can be flexibly deployed in various different networks topologies, with an example topology shown in FIG. 1. An example of a device, which can serve as router 30 through 35, is the 3260 Message Router from Solace Systems, Inc. Note that routers 30 through 35 may be deployed as an overlay to an underlying network, such as an IP/MPLS network, or other communications networks as is known in the art. Connected to network 24 is a plurality of messaging applications or clients 8 through 22, which may be any type of device or software which wishes to send and receive messages, with the message delivery to the one or more recipients being provided by network 24. Note that while only a small number of clients are shown, such a delivery network can support a large number of clients, such as millions, and can scale to a large number of message routers.

FIG. 1 also shows an example of a message 23 being submitted by client 10. This example message results in a copy 23A being delivered to client 8, a copy 23B being delivered to client 13, a copy 23C being delivered to client 22, a copy 23D being delivered to client 20, and a copy 23E being delivered to client 19. The message 23 can be routed to the set of interested destinations based on hierarchical queue or topic names as is known in the art, by IP multicast as is known in the art, or by the content of the message using content routing techniques as described in U.S. Pat. No. 7,801,857. As a short summary of the routing method, the inbound router 30, upon receiving message 23, determines the set of local clients interested in the message (client 8), as well as the set of remote message routers interested in the message (31, 33 and 34). The present invention defines a system for efficiently communicating the clients' (8 to 22) subscription interests between routers 30 through 35, and for forwarding the published messages 23 amongst routers 30 through 35 in a loop-free manner.

Figure 2:
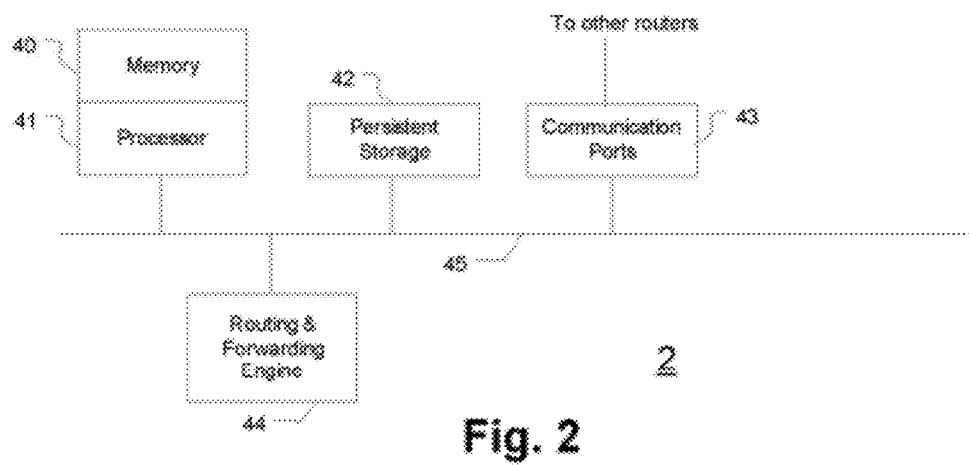
FIG. 2 shows a block diagram of a device that may be used in this invention.

FIG. 2 shows a block diagram of an exemplary device 2 (representing a device such as an individual message router from the set of 30 through 35) of the present invention, which includes a (or many) central processing unit (CPU) 41 with associated memory 40, persistent storage 42, a plurality of communication ports 43 (which may just do basic input/output functions, leaving the protocol processing to CPU 41, or which may have specialized processors such as networks processors or other hardware devices to do protocol processing as well, such as IP processing, UDP or TCP processing, HTTP processing, etc.), a routing and forwarding engine 44, and a communication bus 45. For an example application of this invention, the processor 41 is responsible for tasks such as running the link state routing protocol (OSPF, IS-IS, XLSP, etc.) the SMRP routing protocol of the present invention, computing routing and FIB tables as described in the present invention, and other router tasks known in the art. The associated memory 40 is used to hold the instructions to be executed by processor 41 and data structures such as message routing tables and protocol state. The persistent storage 42 is used to hold configuration data for the router, event logs and programs for the processor 41. The persistent storage 42 (also called non-volatile storage) may be redundant hard disks, flash memory disks or other similar devices. The communication ports 43 are the ports that the router uses to communicate with other devices, such as other routers and hosts (messaging clients). Many different technologies can be used, such as Ethernet, Token Ring, SONET, etc. The routing and forwarding engine 44 combined with the communication ports 43, implement the datapath of the router, including the Per-Ingress-Router Pruned Forwarding Information Databases (FIBs) (FIG. 4 108) generated by the present invention, the lookup table of subscriptions to subscribing-router list (FIG. 11 208) generated by the present invention, and the lookup table of client-subscriptions (FIG. 12 308). Alternatively the FIBs and lookup tables may be implemented by the processor 41 and memory 40. The internal organization of the FIBs and lookup tables may be Patricia Trees, Hash Tables, or other such data structures that are known in the art. The communications bus 45 allows the various router components to communicate with one another, and may be a PCI bus (with associated bridging devices) or other inter-device communication technologies known in the art.

The invention may be implemented as a computer program residing in the persistent storage 42.

Figure 3:
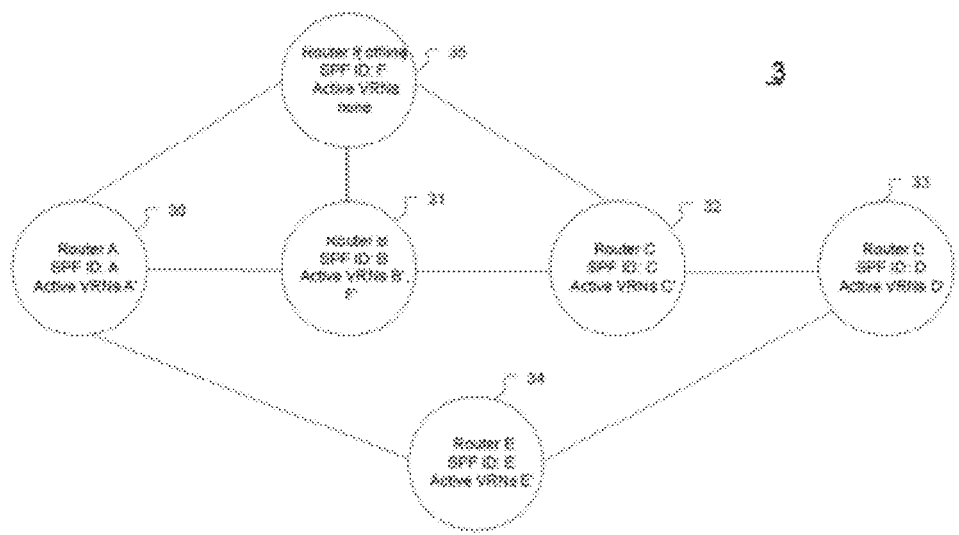
FIG. 3 is another view the example message network introduced FIG. 1, focusing only on the routers in the network.

FIG. 3 shows a more detailed view of Routers 30 through 35. In this example network 3, Router 31 and Router 35 form an active-active pair. Other redundancy models such as active-standby, and n+1 are also possible but are not illustrated in this example. In this example network 3, Router 35 is off-line, and Router 31, in addition to acting on its own behalf, is acting as Router 35's backup router, and has assumed responsibility for Virtual Router Name (VRN) F'. This means that Router 31 has taken responsibility for Router 35's virtual IP address, is sending SMRP routing messages for VRN F', and the clients which would normally connect to VRN F' on Router 35 have instead connected to VRN F' on Router 31.

Figure 4:
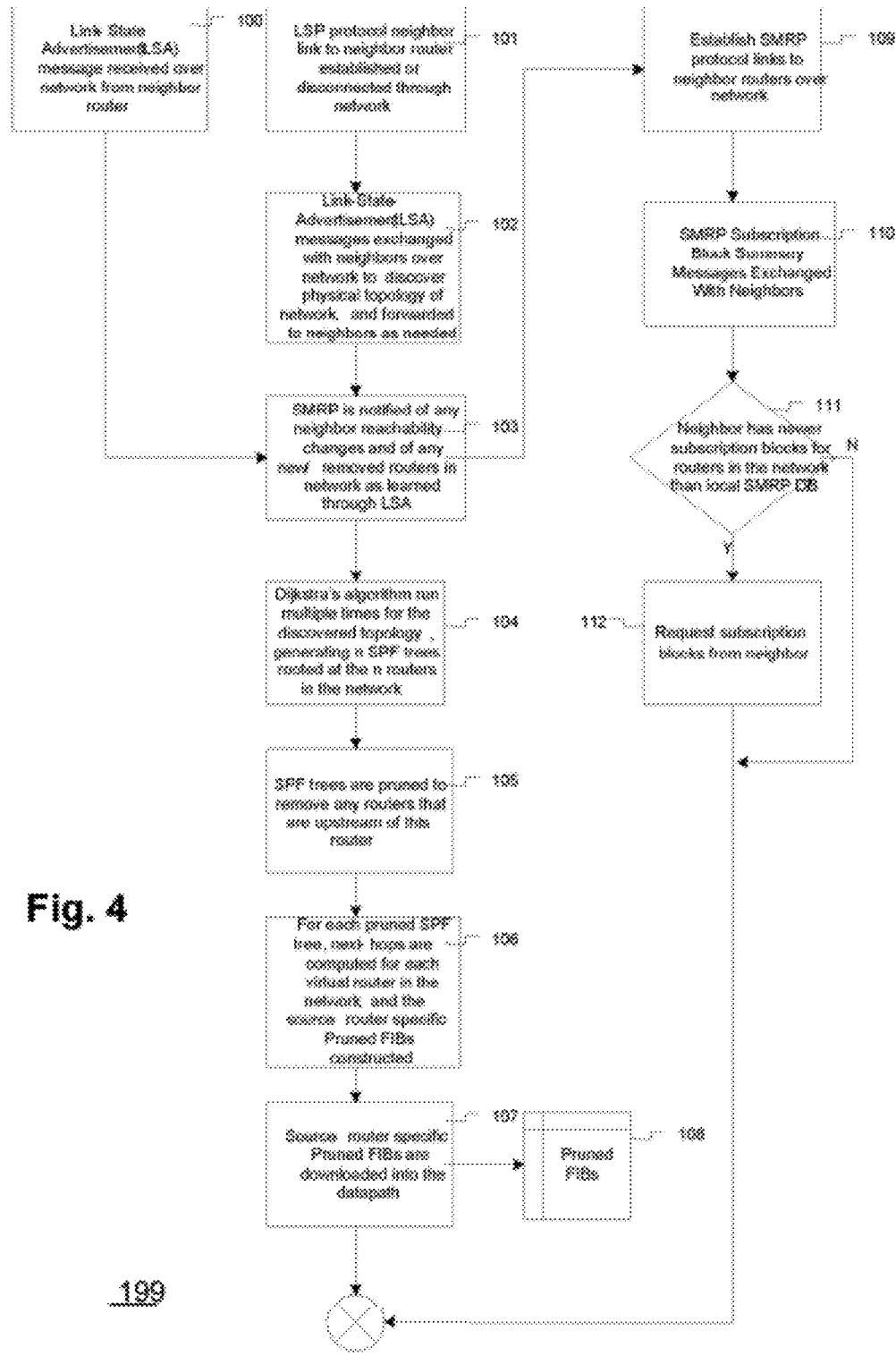
FIG. 4 illustrates how the modified SPF mechanism generates pruned SPF trees, and source-router-specific pruned FIBs.

FIG. 4 shows the mechanism for generating the Pruned Forwarding Information Bases (FIBs) within an exemplary device of the present invention (representing the individual message router 30 from FIG. 3), and for initiating the SMRP protocol communication between routers. At step 101 the link state protocol establishes links to its neighbor routers in the network that have also implemented the link state protocol. At step 102 through mechanisms already well-known in the art, the router exchanges link-state advertisements with its neighbor routers. This invention incorporates U.S. Pat. No. 7,859,992 to modify the standard LSA advertisement to include not only a physical identifier for the router, but a list of Virtual Router Names (VRN) for which that physical router is providing service. This allows the VRNs to be dynamically moved from one physical router to another physical router for the purpose of fault tolerance and redundancy. At step 103, the link state protocol notifies SMRP of any new routers that have been discovered in the network, and of any routers that have disappeared from the network.

At step 104, the exemplary Router 30 runs the Dijkstra algorithm to calculate SPF trees, as is known in the art. However, unlike the existing art, which would calculate a single SPF tree rooted at the exemplary router, the present invention calculates n SPF trees, where n is the number of routers in the network, with one tree rooted at each router in the network. The resulting source-router-specific SPF trees in Router 30 for the exemplary network of FIG. 3 are as shown in FIG. 5.

At step 105, the source-router-specific SPF trees are pruned by the exemplary Router 30 to remove any routers that are upstream of Router 30, resulting in the source-router-specific pruned SPF trees as shown in FIG. 6.

At step 106, the source-router-specific pruned FIBs are constructed for each VRN in the network. The source-router-specific pruned FIBs are used when forwarding multicast data messages, to avoid forwarding loops. When forwarding multicast data messages, the FIB that must be consulted at each router in the network is the FIB that is derived from a pruned SPF tree rooted at the VRN where the message first entered the network.

As the LSA messages contain not only physical router identifiers, but also the active VRNs on each physical router, the next-hop for a given VRN will be the same as the next-hop for the physical router that is active for the VRN. At step 107 the resulting pruned FIBs 108 are downloaded into the datapath to be used for message forwarding. FIG. 7 illustrates the pruned FIBS in Router 30 for the exemplary network of FIG. 3. As shown in FIG. 7, within the pruned FIB, VRNs are used to identify ingress routers and destinations in the FIB, whereas the next hops refer to the SPF router ID that the message needs to be forwarded to. A further optimization that is well known in the art is to replace the next-hops in the FIB with egress link identifiers when the FIB is implemented in the datapath.

An identical pruning and FIB-building process is also executed on exemplary Routers 31 through 34, with identical initial SPF trees. However, the subsequent pruned SPF trees and pruned FIBs will be different on each of the routers.

At step 109, the SMRP protocol in the exemplary device Router 30 will establish SMRP protocol links over the network to any new neighbors learned through the LSP protocol in step 103. At step 110, SMRP will exchange Block Summary messages with the neighbor routers, and at steps 111 and step 112, request Subscription Blocks from the neighbors for any blocks in the local SMRP database which Router 30 deems to be "old" from the Block Summary Message exchange.

At periodic intervals, and when links are connected or disconnected, link state advertisements will be generated by other routers in the network, as indicated in step 100. This results in the same actions of steps 101 through 112 described above.

Figure 8:
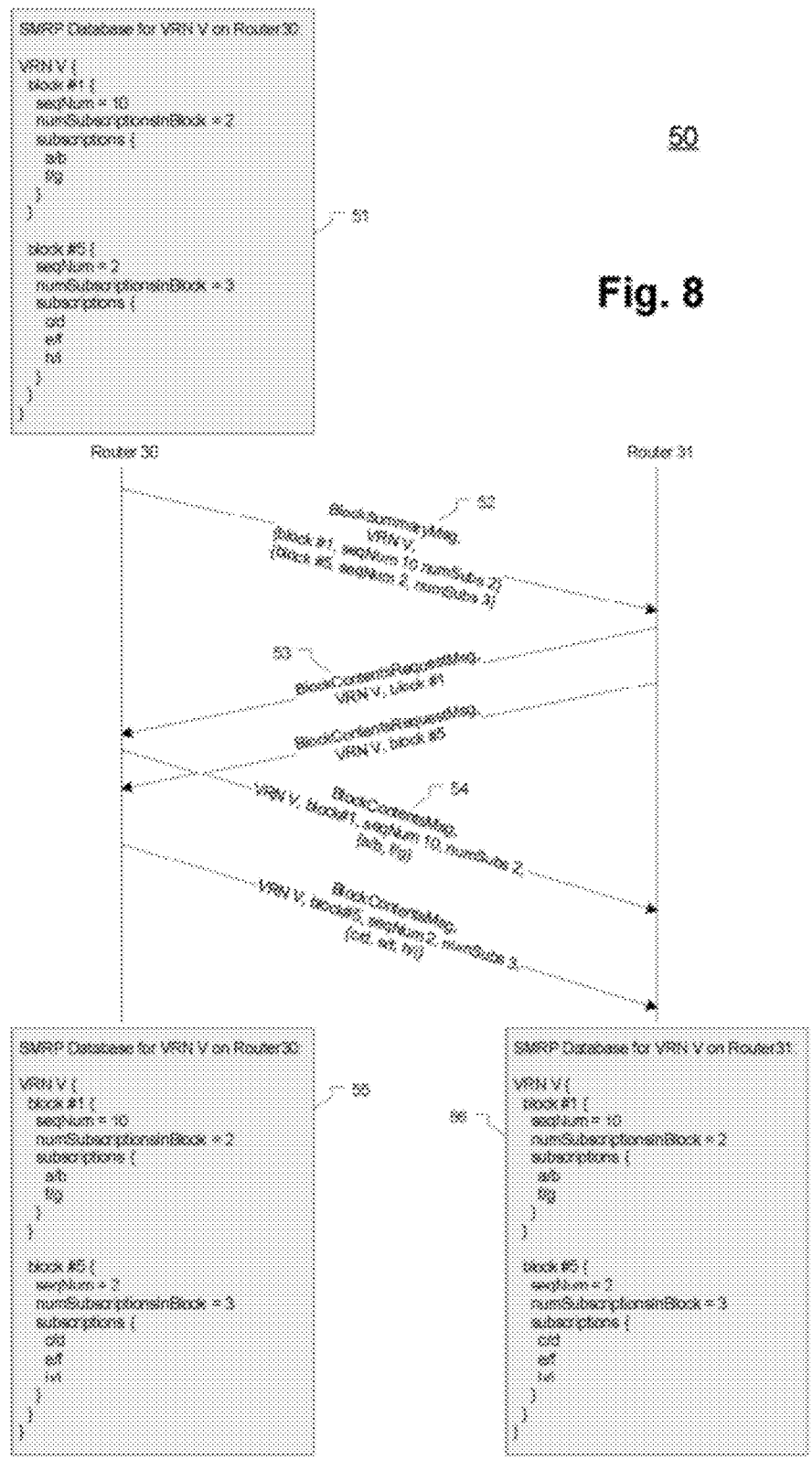
FIG. 8 illustrates the message exchange pattern for initial synchronization of SMRP databases.

FIG. 8 provides a more detailed examination of the initial SMRP message exchange pattern of FIG. 4 steps 109 through 112. FIG. 8, Item 51 shows an exemplary SMRP database some VRN V that is known to Router 30, but is unknown to Router 31. At step 52, Router 30 sends a BlockSummaryMsg to Router 31. Router 31 is unaware of any the SMRP subscription blocks advertised in the BlockSummaryMsg, so at step 53, Router 31 requests the full contents of the subscription blocks which were summarized at step 52. At step 54, Router A sends the requested subscription blocks to Router 31. At the end of this message exchange Router 30's SMRP database 55 is identical to Router 31's SMRP database 56. As shown in FIG. 8, items 51, 55, and 56, there can and typically will be multiple subscription blocks in the SMRP database for a given VRN.

Figure 9:
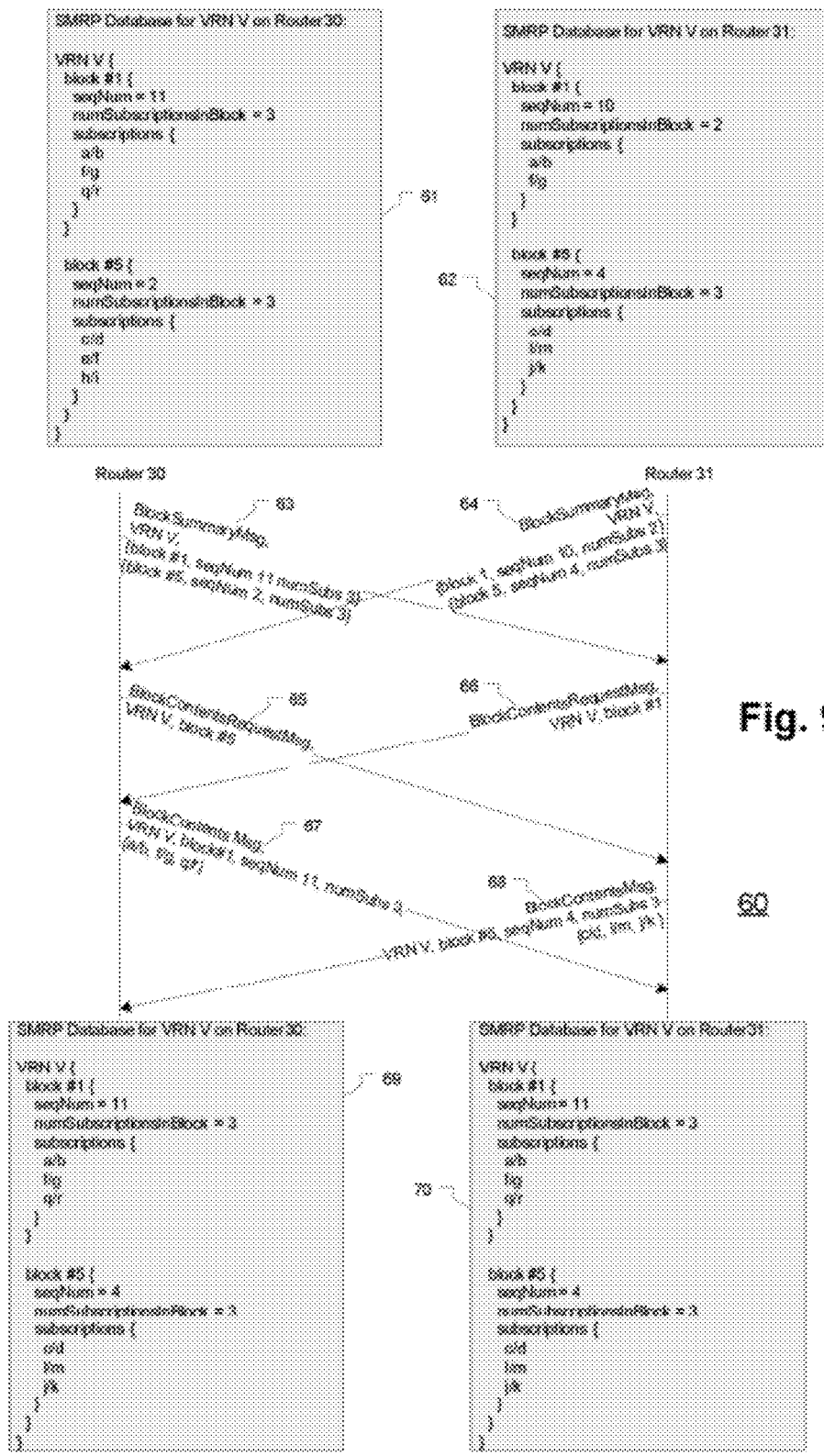
FIG. 9 illustrates the message exchange pattern for resynchronization of SMRP databases following reestablishment of connectivity between two routers after connectivity had been lost.

FIG. 9 illustrates how the SMRP subscription blocks are resynchronized following a loss of connectivity between Router 30 and Router 31, during which time both routers saw changes to the SMRP subscription blocks. As a result, when connectivity between Router 30 and Router 31 is reestablished, the SMRP database 61 on Router 30 is different than the SMRP database 62 on Router 31. To begin the resynchronization, at step 63 Router 30 sends a BlockSummary message to Router 31, and at step 64, Router 31 sends a BlockSummary message to Router 30. At step 65, Router 30 examines the received BlockSummary message from Router 31, discovers that Router 31 has a newer version of (VRID V, block #5), and requests (VRID V, block #5) from Router 31. At step 66, Router 31 examines the received BlockSummary message from Router 30, discovers that Router 30 has a newer version of (VRID V, block #1), and requests (VRID V, block #1) from Router 30.

At step 67, Router 30 sends the requested subscription block to Router 31. At step 68, Router 31 sends the requested subscription block to Router 30. At the end of this message exchange, the SMRP database 69 on Router 30 is identical to the SMRP database 70 on Router 31.

Figure 10:
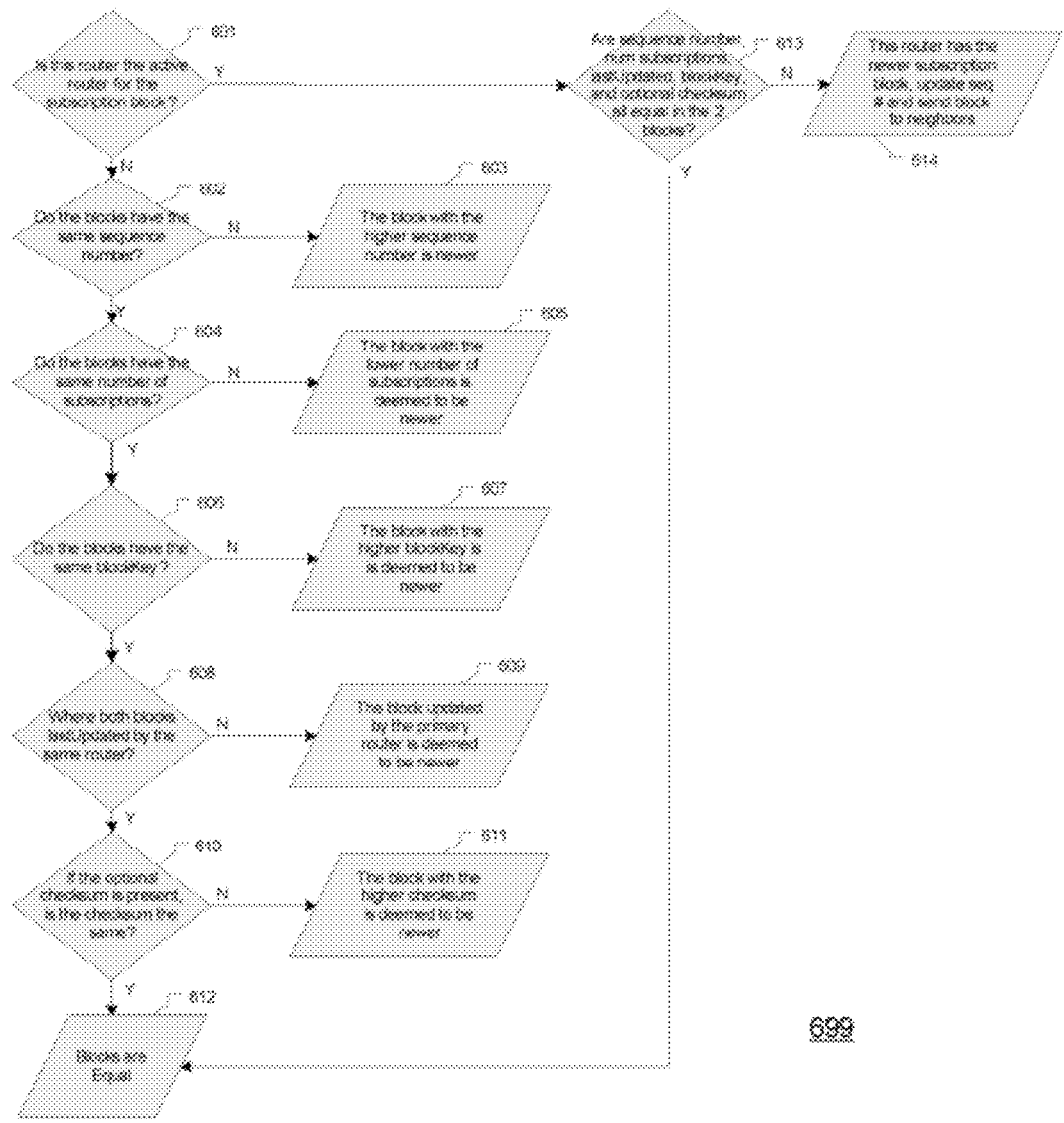
FIG. 10 illustrates the mechanism that SMRP uses to compare two subscriptions blocks, to determine which is newer.

FIG. 10 illustrates the mechanism used by SMRP to determine which subscription block—the block in the local SMRP database of the router or the block/block summary received from another router—is the newest block. Step 601 checks to see if the exemplary router has received a subscription block for the VRN for which it is active. If the exemplary router is active for the VRN, then at step 613, the exemplary router checks to make sure that the subscription block received is identical to the contents of the local SMRP database, in terms of sequence number, number of subscriptions, the VRN that last updated the subscription block, and the optional checksum of the block. If any of these fields do not match, then at step 614, the exemplary router increments the sequence number of the block in the local SMRP database to be greater than the sequence number in the received message, and sends the updated subscription block to all the neighbor routers.

Steps 602 through 612 show the remaining checks that are conducted to determine whether the received block/block summary or the block in the local SMRP database is newer, when the exemplary router is not the active router for the VRN. Of particular note is Step 606, which compares the BlockKey between the two subscription blocks. The BlockKey is a 64-bit random integer which is generated when a subscription block is first allocated by the originating router, and remains unchanged for the lifetime of the block. This step detects when two subscription blocks are not identical, even though they may have the same sequence number, and the same number of subscriptions. Such a database inconsistency can potentially occur in situations where a network is bifurcated for a period of time, and the router that originated the subscription blocks is restarted before the network connectivity is fully restored.

Figure 11:
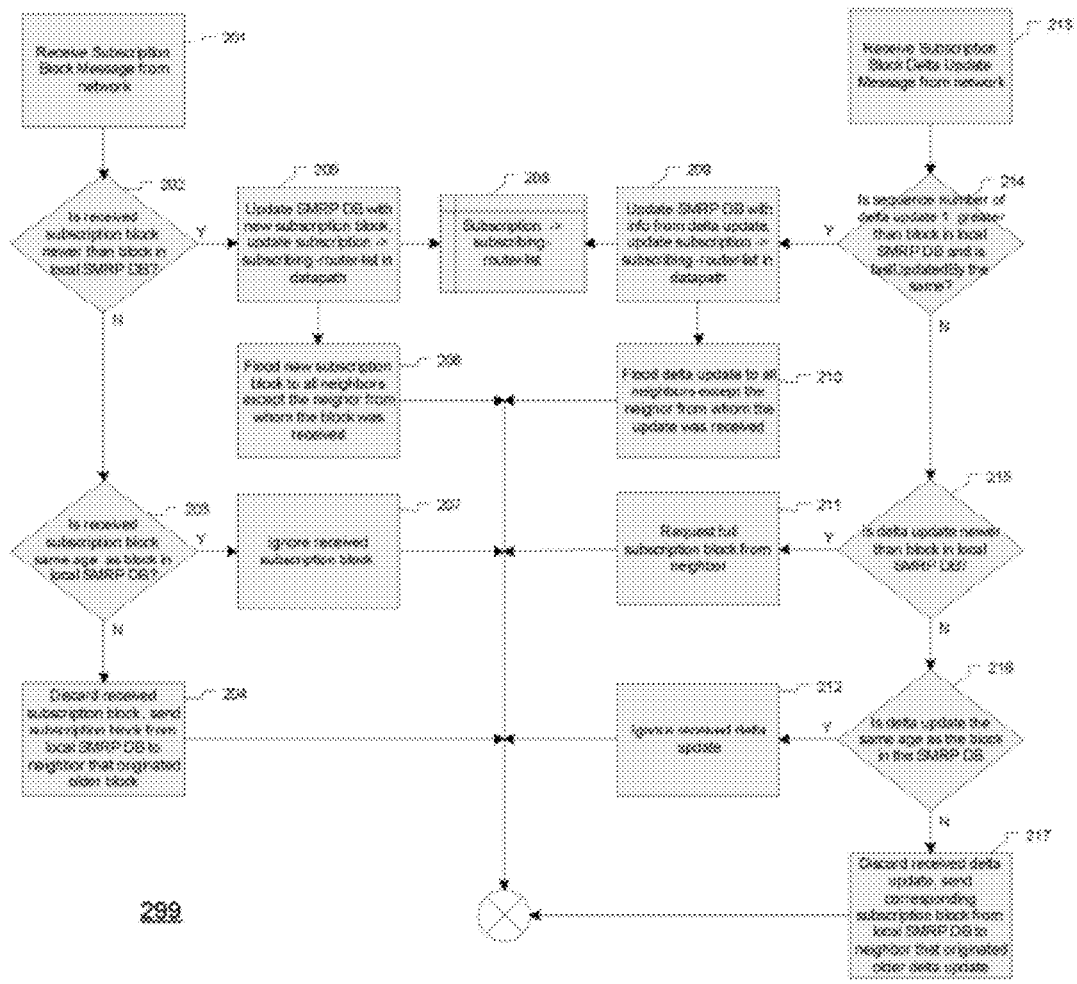
FIG. 11 illustrates the mechanisms used to process subscription blocks, and subscription block delta update messages received from the network.
Figure 12:
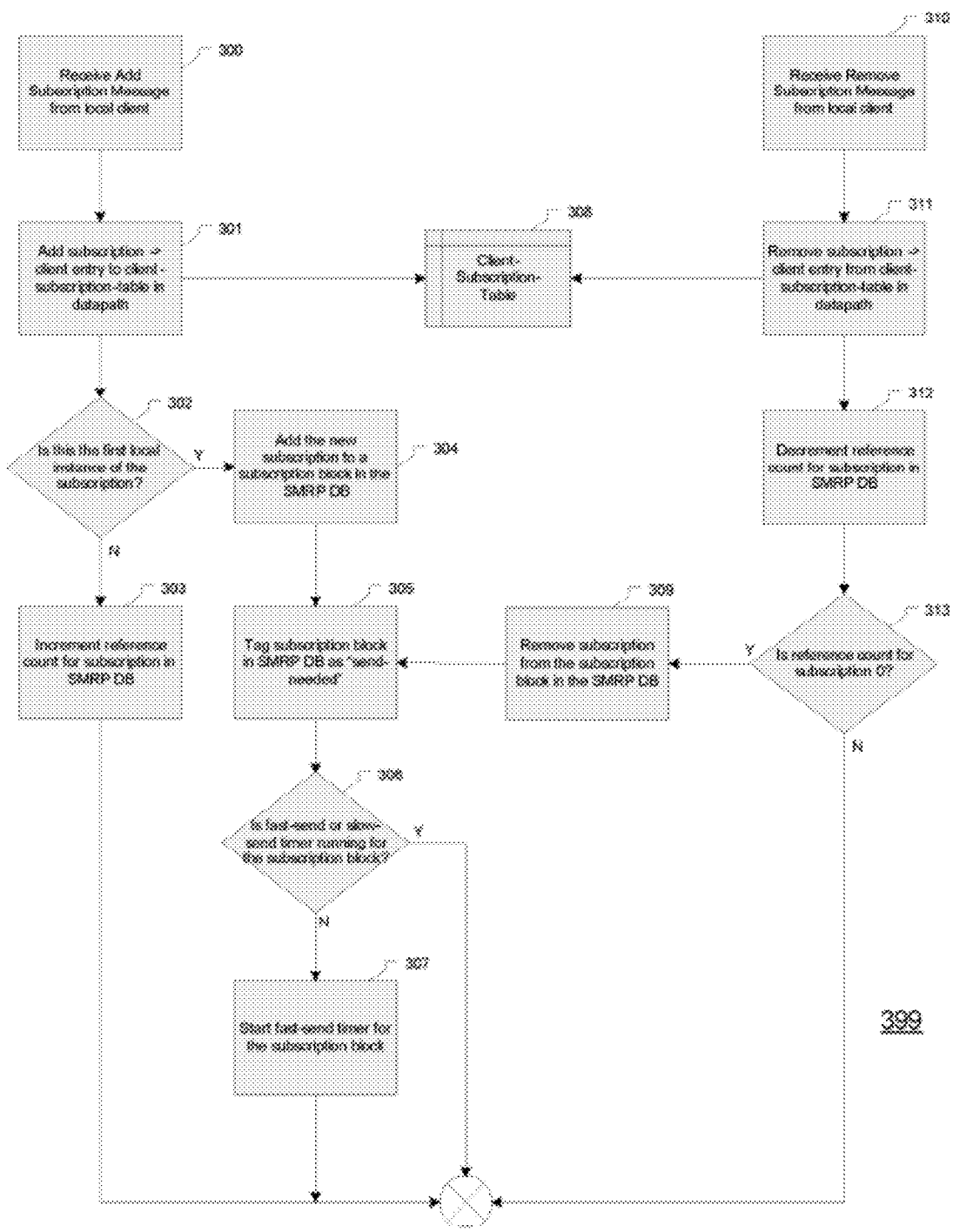
FIG. 12 illustrates the mechanisms used to process add-subscription and remove-subscription messages received from locally-connected clients.

FIG. 11 illustrates the actions performed by SMRP when Subscription Block messages, or Subscription Block Delta Update messages are received by the exemplary router. At step 201, the exemplary router receives a subscription block message from the network. At step 202, the router determines whether the subscription block received is newer than the block in the local SMRP DB, using the mechanism of FIG. 10.

If the received block is newer:
  At step 205, the router updates the SMRP DB with the new subscription block, and updates the Subscription→subscribing-router-list 208 in the router datapath to incorporate the contents of the subscription block
  At step 206, the router sends the new subscription block to all neighbor routers, except the neighbor router from whom the subscription block was received Otherwise, at step 203, the receiving router checks to see whether the received subscription block is the same age as the block in the local SMRP DB, using the mechanism of FIG. 10. If it is the same age, then at step 207 the received subscription block may be safely ignored.

But if at step 203 it is determined that the receiving router has a newer version of the subscription block, then at step 204, the receiving router ignores the received subscription block, and sends it's own newer version of the subscription block to the neighbor router that originated the older subscription block.

At step 213, the exemplary router may receive a subscription block delta update from a neighbor router. At step 214, the router checks to ensure that the sequence number has only incremented by one, since a delta of more than one cannot be applied to the SMRP DB. The router also checks to see that the delta update was generated by the same physical router as the subscription block in the SMRP DB, since a delta update cannot be safely applied if the update was generated by a different physical router than the router that created the original subscription block. If both of these conditions hold true:

At step 209, the router applies the delta update to the SMRP DB, and updates the Subscription→subscribing-router-list 208 in the router datapath to incorporate the contents of the delta update At step 210, the router sends the delta update to all neighbor routers, except the neighbor router from whom the delta update was received Otherwise, if the delta update cannot be applied, then at step 215 the receiving router checks to see if the delta update represents a newer version of the subscription block, using the method of FIG. 10. If the delta update is newer, then at step 211, the receiving router requests the full subscription block from the neighbor router that sent the delta update.

If the delta update is not newer, then at step 216, the receiving router checks to see if the delta update is the same age as the block locally stored in the SMRP DB, and if the update is the same age, then at step 212 the delta update is simply ignored. Otherwise at step 217, the receiving router discards the delta update, and sends it's own newer version of the subscription block to the neighbor router that originated the older delta update.

FIG. 12 shows the behaviors of SMRP on exemplary Router 30 of FIG. 1 and FIG. 3 when one of the exemplary clients 8 through 10 of FIG. 1 add or remove a subscription from the router. At step 300, the router receives an "add subscription" message from the client. At step 301, the router adds the subscription-to-client-mapping into the client subscription table 308 in the router datapath. At step 302, a check is made to determine whether this is the first client to request the particular subscription contained in the "add subscription" message, and if not, then at step 303, a reference count for the subscription is simply incremented in the SMRP DB.

Otherwise, at step 304, the new subscription is added to a subscription block in the SMRP database. To optimize new subscription propagation, the subscription is preferentially added to a partially-filled subscription block that already has a fast-send timer running. If no blocks for the VRN have the fast-send timer running, then the subscription is added to a partially-filled or empty block that has no timers running, and if no block can be found that can meet that criteria, then the subscription is added to a partially filled block that has the slow-send timer running. At step 305, a "send-needed" flag is set on the subscription block. Then, at step 306, a check is made on whether the subscription was added to a block that already had a send-timer running, and if not, then at step 307, the fast-send timer is started for the subscription block.

At step 310, the router receives a "remove subscription" message from the client. At step 311, the router removes the subscription-to-client-mapping from the client subscription table 308 in the router datapath. At step 312, the router finds the subscription block in the SMRP database containing the subscription, and decrements the reference count for the subscription. At step 313, if the reference count for the subscription is still greater than zero, then no other action needs to be taken.

However, if the reference count reaches zero, then at step 309, the subscription is removed from the SMRP DB. At step 305, the subscription block is flagged as "send needed". Then, at step 306, a check is made on whether the subscription was removed from a block that already had a send-timer running, and if not, then at step 307, the fast-send timer is started for the subscription block.

Figure 13:
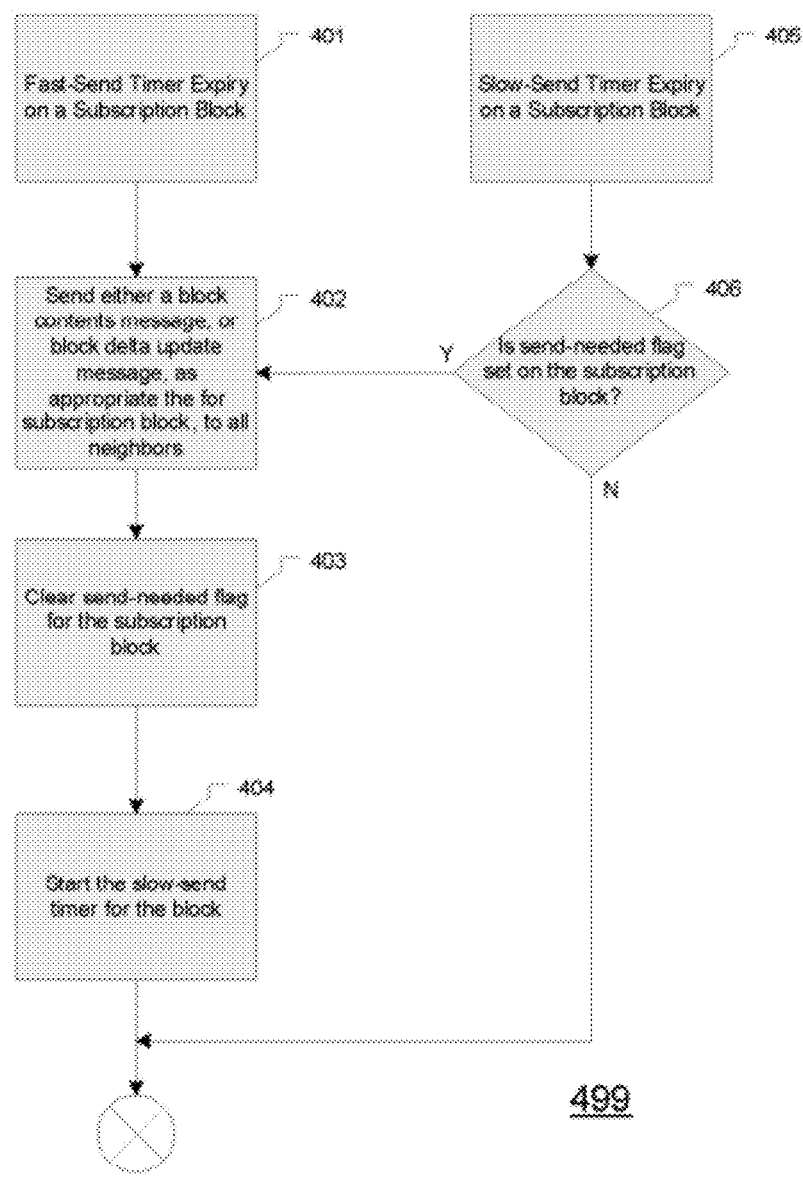
FIG. 13 illustrates the mechanisms used when fast-send and slow-send timers expire for a subscription block.

In the discussion of FIG. 12, no SMRP messages were actually sent in response to client subscription adds and removes, but instead send timers were simply started for the corresponding subscription blocks, if the send timers for those subscription blocks were not already running. This mechanism allows multiple subscription updates to be grouped together, and sent into the network at one time, rather than being sent individually, thus reducing the overall network bandwidth that is consumed propagating SMRP messages between routers. FIG. 13 illustrates the mechanism by which the SMRP delta updates are ultimately sent into the network when the send-timers expire. At step 401, the fast-send timer expires for a subscription block. As a result, at step 402, a block delta update message is sent by the router to all the neighbor routers. To avoid excessive subsequent resends of this block which was just advertised, at step 403 the "send-needed" flag is cleared for the block, and at step 404, the slow-send timer is started for the block.

At step 405, the slow-send timer expires for a subscription block. As a result, at step 406, the "send-needed" flag is checked for the subscription block. If this flag is clear, then no further action is required for the subscription block. But if the flag is set, it indicates that the subscription block changed since it was last advertised into the network. As a result, at step 402, a block delta update message is sent by the router to all the neighbor routers. To avoid excessive subsequent resends of this block which was just advertised, at step 403 the "send-needed" flag is cleared for the block, and at step 404, the slow-send timer is started for the block.

The mechanism of FIG. 13 may also be used to rate-limit the sending of full subscription block updates, in addition to the illustrated sending of delta updates.

Routing protocols known in the art will periodically flood their entire routing tables to all other routers in the network, to ensure that inconsistent routing information is flushed from the network. However, SMRP is designed to scale to millions of multicast subscriptions, and periodic flooding of the entire subscription database would consume excessive network resources. So instead, with SMRP, each router in the network periodically sends Database Summary Messages for all the VRNs for which it is active.

Figure 14:
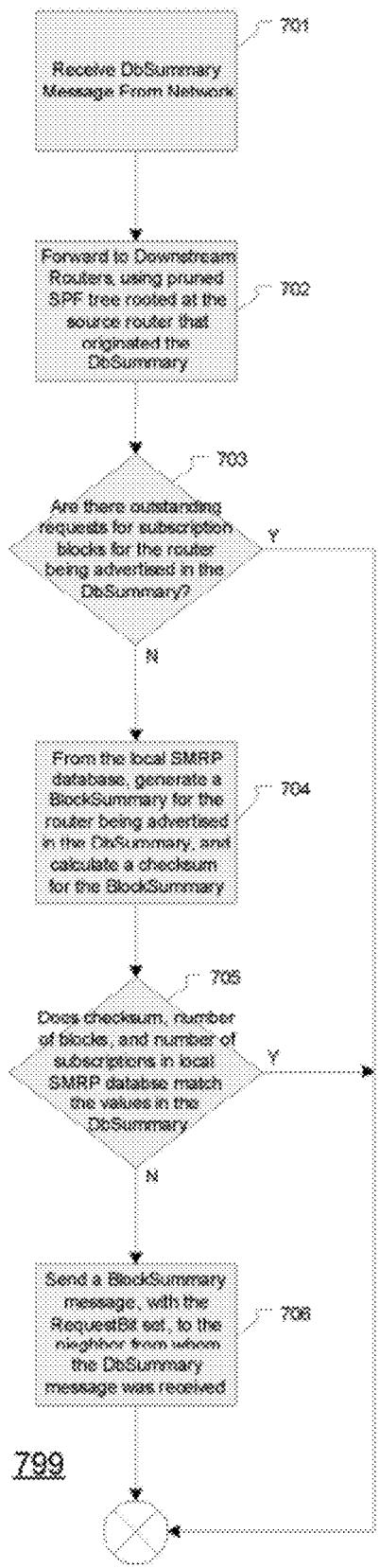
FIG. 14 illustrates the operations that are performed when a DbSummary message is received by a router.

FIG. 14 illustrates the behavior of an exemplary router when it receives a DbSummary message at step 701. At step 702, the receiving router forwards the DbSummary to all neighbors that are downstream of the receiving router, according to the pruned SPF tree routed at the source VRN for the DbSummary. At step 703, the receiving router checks to see if it has block requests outstanding for the VRN, which a neighbor router has not responded to yet. If requests are outstanding, then the receiving router already knows that its SMRP DB for the VRN is not fully up to date, so no further action is required.

However, if no requests are outstanding, then at step 704 the receiving router internally generates a BlockSummary for the VRN contained in the DbSummary, and computes a checksum for that BlockSummary. To minimize the possibility of a checksum inadvertently matching when it should not, it is preferable to use a reasonably strong checksum such as the 32-bit Fletcher checksum which is well known in the art, for the DbSummary messages.

The checksum, number of blocks, and number of subscriptions in that BlockSummary are then compared to the contents of the DbSummary in step 605. If all these fields match, then the SMRP DB is confirmed to be synchronized for the VRN. Otherwise, in step 606, a BlockSummaryRequest message is sent to the neighbor router from whom the DbSummary message was received, so that the receiving router can reconcile its own local SMRP DB for the VRN with the SMRP DB of the neighbor router.

FIGS. 16 through 21 show exemplary contents of the SMRP messages that are exchanged between routers. SMRP communicates with other routers in the network by sending protocol messages over a reliable transport protocol such as TCP, or any other reliable protocol as is known in the art. The SMRP protocol messages may be binary encoded into fixed fields, tag-length-value encoded, or encoded by any other method for transmission as is well known in the art.

Figure 15:
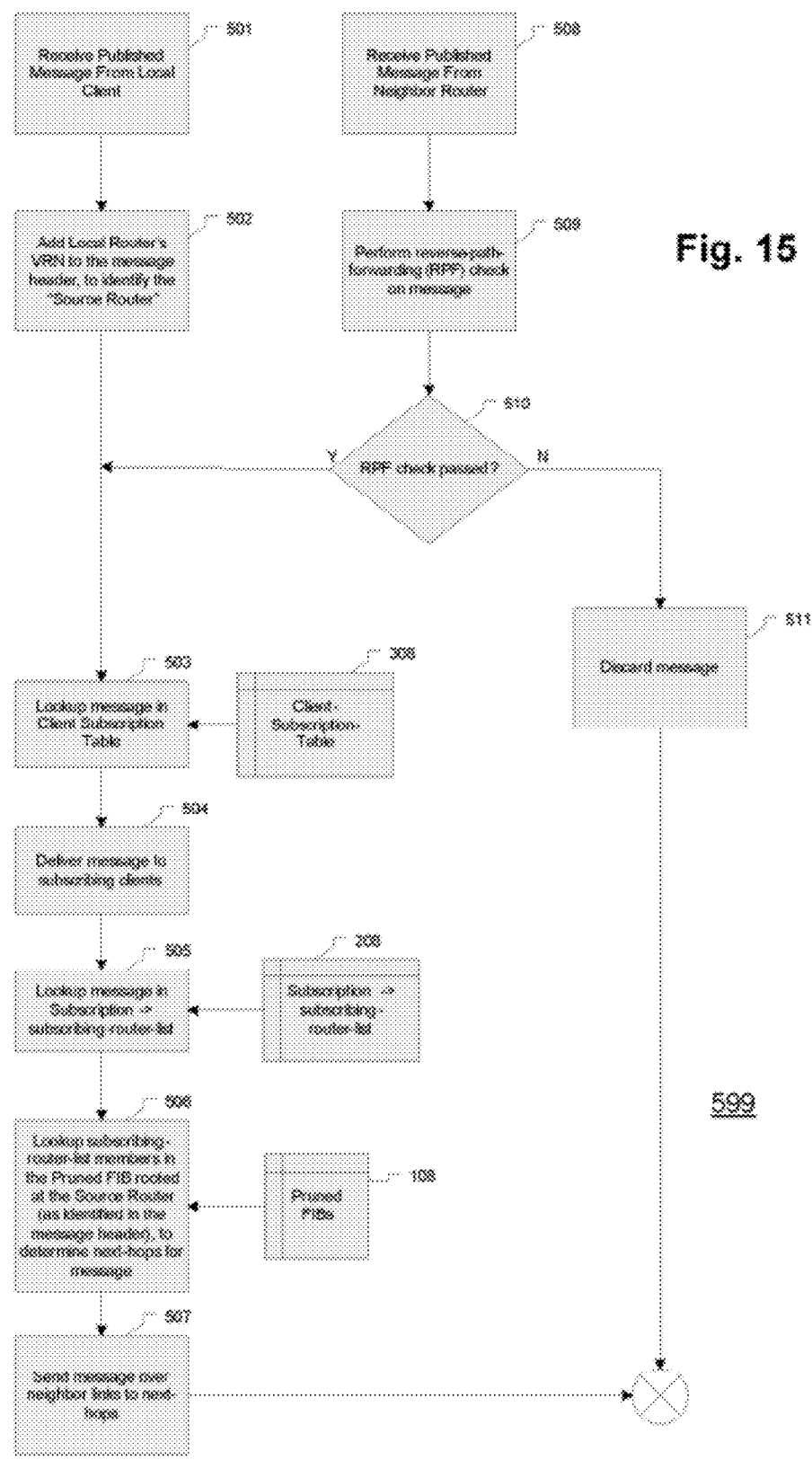
FIG. 15 illustrates the datapath forwarding mechanisms for published messages received from local clients, and from other routers in the network.

FIG. 15 illustrates the procedure followed by the datapath of an exemplary router to forward a multicast data message received from either a directly connected client, or another router in the network. At step 501, the router receives a published message from a directly connected, or local client. At step 502, the router's VRN is added to the header of the published message. The VRN may be any identifier which is globally unique in the network, such as a textual string, or an IP address.

At step 508, the router receives a published message from a neighbor router in the network. The pruned FIB-generation mechanism illustrated in FIG. 4 ensures loop-free message forwarding when the topology is stable. However, during topology changes in the network, there can be short-term transient conditions where some of the routers have not recomputed their pruned FIBs, and temporary forwarding loops can exist in the network To suppress a transient forwarding loop, at step 509, the same Reverse Path Forwarding (RPF) check used by IP Multicast routers is applied based on the source VRN of the message. When a data message originated by VRN V arrives at Router R over neighbor interface L, the RPF check is as follows:

a) If R is the active router for V, the message is discarded
b) Otherwise, the next-hop for V is looked up in the pruned FIB 108 rooted at router R. If the next-hop interface is not found, or the next-hop interface is not L, then at step 511, the message is discarded, and an appropriate statistic incremented Otherwise, if the RPF check of step 510 passes, or the message is a message from a locally attached client that has completed step 502, then the multicast destination (which could be a hierarchical topic, IP multicast address, full message content, or any other identifier known in the art for identifying multicast destinations) is extracted from the message, and at step 503, that message destination is looked up in the Client Subscription Table 308 which was generated by the mechanism shown in FIG. 12. The Client Subscription Table 308 returns the list of clients with matching subscriptions for the message. In step 504, the message is delivered by the router to the clients with matching subscriptions.

In step 505, the message destination is looked up in the Subscription→Subscribing-Router-List 208 which was generated by the mechanism shown in FIG. 11. The Subscription→Subscribing-Router-List 208 returns a complete list of routers which have matching subscriptions.

To prevent multicast forwarding loops, it is important at this point to only forward the data message to routers that are downstream of the receiving router. So at Step 506, the Source VRN is extracted from the header of the message, and the Pruned FIB 108 rooted at the Source VRN, as generated by the mechanism shown in FIG. 4, is consulted to determine the next-hops for the destination routers identified in step 505. Next-hops may not be found for all destination routers identified in step 505—those routers that are not found are upstream of the receiving router, and the message does not need to be forwarded to those upstream routers.

In step 507, the message is forwarded to the next-hop routers found in step 506. Many destination routers may have the same next-hop router; in those cases only one copy of the message is forwarded to a given next-hop router.

It will be appreciated that an exemplary embodiment of the invention has been described, and persons skilled in the art will appreciate that many variants are possible within the scope of the invention.

All references mentioned above are herein incorporated by reference.

We claim:

1. A method of routing multicast messages in a network wherein subscribers receive messages from publishers based on subscriptions, the network comprising a plurality of n interconnected routers, the method comprising:
    propagating a physical Topology of the network using a link state routing protocol;
    propagating subscription interests of subscribers throughout the network using a subscription management protocol decoupled from the link state routing protocol;
    maintaining a subscription database at each router;
    at the each router in the network computing n shortest-path first trees from a root router to every other router in the network, wherein one shortest-path first tree computed a router is rooted at the each router in the network;
    pruning said n shortest-path first trees at the each router to remove any routers upstream of that router to create n pruned shortest-path first trees wherein each pruned shortest-path first tree at that router contains only that router and any routers downstream thereof;
    constructing a pruned forwarding information base (FIB) at the each router containing said n pruned shortest-path first trees; and
    at a particular receiving router forwarding multicast messages received from an originating router using the each pruned shortest-path first tree in the pruned FIB at the receiving router associated with the originating router.

2. The method of claim 1, wherein the subscription management protocol messages are selected from a group consisting of: database summary messages, block summary messages and block contents messages.

3. The method of claim 2, wherein the database summary messages include an error check selected from the group consisting of: checksums, block counts, subscription counts, and a combination thereof.

4. The method of claim 1, wherein at least some of the routers in the network are virtual routers hosted by physical routers.

5. The method of claim 4, wherein some of the routers are deployed in an active-standby, active-active, or n+1 redundancy scheme, and routing topology updates are advertised on behalf of the virtual routers which are hosted on the physical routers.

6. The method of claim 1, wherein the subscription management protocol uses a flooding mechanism to propagate the subscription interests of the each router.

7. The method of claim 1, wherein when a message is published to an ingress router by a locally attached client, an ingress router identifier is added to the message so that an appropriate Pruned Shortest-Path-First Tree can be referenced by downstream routers in the network.

8. The method of claim 7, wherein the each router in the network recomputes a Pruned Shortest-Path-First Tree and the Pruned FIB for every other router in the network whenever a network topology change is detected.

9. The method of claim 1, a reverse path forwarding mechanism is applied to messages forwarded over Pruned Shortest-Path-First trees to ensure that transient forwarding loops do not occur during times when the physical topology of the network is changing and routing protocols have not yet converged.

10. The method of claim 1, wherein the subscription database maintained at the each router is divided into subscription blocks.

11. The method of claim 10, wherein in response to restoration of connectivity or a particular router learning of new neighbors through the link state protocol, the particular router exchanges block summary messages with its new neighbors.

12. The method of claim 11, wherein the block summary messages that include an error check selected from a group consisting of: checksums, block counts, subscription counts, and a combination thereof.

13. The method of claim 11, wherein in response to the particular router learning from the block summary exchange that its database is outdated, the particular router requests subscription blocks from its neighbors to update is local subscription database.

14. The method of claim 11, wherein in response to add or remove subscription messages from a client, the originating router updates a subscription block in its local subscription database.

15. The method of claim 14, wherein the originating router sets a "send needed" flag on the updated subscription block.

16. The method of claim 15, wherein a delta update subscription block identifying changes in the updated subscription block is sent to all neighboring routers in response to timeout.

17. The method of claim 16, wherein a fast send timer is started when the "send needed" flag is first set on the updated subscription block, and upon timeout of said fast timer in addition to a delta update subscription block being sent to the all neighboring routers, the "send-needed" flag is cleared and a slow timer is started for the updated subscription block, and any subsequent updates to the subscription block while the slow timer is running are sent at a expiry of the slow timer.

18. The method of claim 17, wherein new subscriptions are preferentially added to partially-filled blocks associated with the fast timer.

19. The method of claim 1, wherein the link state protocol is selected from a group consisting of: Extended Link State Protocol (XLSP), Open Short Path First (OSPF), and Intermediate System to Intermediate System (IS-IS).

20. A system for routing multicast messages in a network wherein the subscribers receive messages from publishers based on subscriptions, the network comprising a plurality of n interconnected routers, the system comprising:
  a link state routing protocol for propagating the physical topology of the network using;
  a subscription management protocol decoupled from the link state routing protocol for propagating subscription interests of the subscribers throughout the network using;
  a subscription database at each router;
  a processor at each router in the network configured to:
  (i) compute n shortest-path first trees from a root router to every other router in the network, wherein one shortest-path first tree computed at the each router is rooted at each router in the network;
  (ii) prune said n shortest-path first trees at the each router to remove any routers upstream of that router to create n pruned shortest-path first trees wherein each pruned shortest-path first tree at that router contains only that router and any routers downstream thereof;
  (iii) construct a pruned forwarding information base (FIB) at the each router containing said n pruned shortest-path first trees; and
  (iv) at a particular receiving router forward multicast messages received from an originating router using a pruned shortest-path first tree in the pruned FIB at the receiving router associated with the originating router.

21. The system of claim 20, wherein at least some of the routers in the network are virtual routers hosted by physical routers.

22. The system of claim 21, wherein some of the routers are deployed in an active-standby, active-active, or n+1 redundancy scheme, and routing topology updates are advertised on behalf of the virtual routers which are hosted on the physical routers.

23. A non-transitory computer readable storage medium having instructions stored thereon, which when executed in a processor at a router, manage the routing of multicast messages in a network wherein subscribers receive messages from publishers based on subscriptions, the network comprising a plurality of n interconnected routers, and wherein when executed in the processor, the instructions cause the processor at the router:
  propagate a physical topology of the network using a link state routing protocol;
  propagate subscription interests of the subscribers throughout the network using a subscription management protocol decoupled from the link state routing protocol;
  maintain a subscription database at each router;
  to compute n shortest-path first trees from a root router to every other router in the network, wherein one shortest-path first tree computed the router is rooted at each router in the network;
  prune said n shortest-path first trees at the router to remove any routers upstream of that router to create n pruned shortest-path first trees wherein each pruned shortest-path first tree at that router contains only that router and any routers downstream thereof;
  construct a pruned forwarding information base (FIB) at the router containing said n pruned shortest-path first trees; and
  forward multicast messages received at the router from an originating router using a pruned shortest-path first tree in the pruned FIB at the receiving router associated with the originating router.

24. The computer readable storage medium of claim 23, wherein the subscription management protocol messages are selected from a group consisting of: database summary messages, block summary messages and block contents messages.

25. The computer readable storage medium of claim 23, wherein the database summary messages include an error check selected from a group consisting of: checksums, block counts, subscription counts, and a combination thereof.

26. The computer readable storage medium of claim 23, wherein the instructions cause the processor to add an ingress router identifier to the message so that an appropriate Pruned Shortest-Path-First Tree can be referenced by downstream routers in the network.

27. The computer readable storage medium of claim 23, wherein the instructions cause the processor to maintain a subscription database at the router divided into subscription blocks.

* * * * *